(12) United States Patent
Gentile et al.

(10) Patent No.: US 7,244,948 B1
(45) Date of Patent: Jul. 17, 2007

(54) MINIATURE MULTINUCLIDE DETECTION SYSTEM AND METHODS

(75) Inventors: Charles A. Gentile, Plainsboro, NJ (US); Andrew F. Carpe, Hammonton, NJ (US); Stephen W. Langish, Eastampton, NJ (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 11/344,026

(22) Filed: Jan. 31, 2006

Related U.S. Application Data

(63) Continuation of application No. 10/384,236, filed on Mar. 6, 2003, now abandoned.

(51) Int. Cl.
*G01T 1/36* (2006.01)
(52) U.S. Cl. ...................................... 250/393
(58) Field of Classification Search ................. 250/393
See application file for complete search history.

(56) References Cited

U.S. PATENT DOCUMENTS 5,378,895 A * 1/1995 Cole et al. ............. 250/390.04
6,252,923 B1 * 6/2001 Iacovino et al. ............ 376/272
6,448,564 B1 * 9/2002 Johnson et al. ............. 250/394

\* cited by examiner

*Primary Examiner*—Constantine Hannaher
(74) *Attorney, Agent, or Firm*—Gibbons, P.C.

(57) ABSTRACT

The present invention is directed toward an apparatus and methods for detection and identification of target radionuclides and threatening radionuclides that may be present in a sample volume. One aspect of the invention provides a digital computational apparatus that determines similarity or identity to a target radionuclide or a threatening radionuclide. In another aspect, the invention provides a high throughput apparatus for detection of a target radionuclide in a sample volume, or for identifying a target radionuclide present in a sample volume. In a further aspect the invention provides a high throughput apparatus for communicating the presence of a target radionuclide in a sample volume, the identity of a target radionuclide in a sample volume, or both to appropriate personnel.

24 Claims, 4 Drawing Sheets

US 7,244,948 B1

MINIATURE MULTINUCLIDE DETECTION SYSTEM AND METHODS

RELATED APPLICATION

This application is a continuation of U.S. application Ser. No. 10/384,236, filed Mar. 6, 2003 now abandoned, and is hereby incorporated by reference herein as if set forth in its entirety.

GOVERNMENT RIGHTS

The present invention was made with Government support and the Government has certain rights in the invention.

FIELD OF THE INVENTION

This invention relates to rapidly detecting and identifying certain nuclear isotopes. More particularly, the invention relates to an apparatus and methods for detecting radionuclides in a sample that are potentially dangerous in uses, such as antisocietal or terrorist activities, that threaten cultural, political or economic structures of civilized society.

BACKGROUND OF THE INVENTION

Modern society, in the past one to two decades, has become subject to antisocietal activities of groups such as terrorist organizations, freedom fighters, individuals of radical persuasion, and individuals holding to anarchist or nihilistic philosophies. Such groups and individuals consider several potential means for physically attacking the fundamental structures of civilized societies. These include deployment and use of weapons of mass destruction, among which are nuclear devices.

Nuclear devices include those which upon triggering produce a fissioning nuclear explosion or a fusion thermonuclear explosion, and a so-called "dirty bomb". In a dirty bomb, an explosion is triggered with the objective of dispersing various toxic or radiologically hazardous radionuclides into an environment with the intent of causing radioactive contamination in a wide physical area. Although only a few selected radionuclides are of use in preparing a fission bomb and in providing the trigger for a fusion bomb, a wide range of radionuclides may potentially be included in a dirty bomb. Radionuclides that are candidates for use in antisocietal devices such as fission bombs, thermonuclear bombs and dirty bombs are termed "threatening" herein. It is believed that the choice of threatening components includes radionuclides with long half-lives for radioactive decay, as well as radionuclides such as those used in medical diagnostics and various research endeavors, which generally have short half-lives. It is important in screening operations to have the capability of detecting and identifying any of the radionuclides potentially usable in a nuclear device.

Since nuclear devices such as those described above may be assembled or deployed at any location within the geographical boundaries of a nation, it would be advantageous for governmental authorities to have the capability of screening for component radionuclides at widely dispersed locations. Common nonlimiting examples of such locations include automotive highways, airports, train stations, municipal mass transit systems, governmental buildings and freight handling facilities. Beneficially the screening installations would be automated and able to operate free of human intervention as long as no radionuclides are detected, but to alert appropriate authorities when a positive detection and/or identification of a specific radionuclide deemed to be a threat is made.

In summary there remains a need for a system and methods to detect and/or identify any of a wide range of radionuclides. There is further a need for such systems and methods to operate rapidly, automatically and independently of human intervention. There remains a need for detection and/or identification systems and methods capable of operating at high volume, and with high throughput. There furthermore remains a need for a system and methods to detect and identify a particular radionuclide from among a set of candidate radionuclides that an antisocietal group or individual might deploy. The present invention addresses these outstanding needs.

SUMMARY OF THE INVENTION

In one aspect of the invention, a digital computational apparatus is disclosed that includes
  a) a device programmed to perform steps that include
    i) comparing characteristics of a sample signal with corresponding characteristics of a plurality of reference signals; and
    ii) determining whether characteristics of the sample signal are similar to or identical to characteristics of at least one reference signal; and
  b) a memory device in which is stored data providing characteristics of two or more reference signals; wherein each reference signal characterizes a signal waveform of a target radionuclide or a threatening radionuclide. In an important embodiment of the digital computational apparatus, a target radionuclide or a threatening radionuclide is chosen from a set that includes cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, or a radioactive decay product of uranium.

In another aspect, the invention discloses a high throughput apparatus for detection of a target radionuclide in a sample volume, or for identifying a target radionuclide present in a sample volume, or both, that includes
  a) detecting means for detecting radiation emanating from a radionuclide in a sample volume, wherein the detecting means produces a sample signal characteristic of the radionuclide;
  b) analyzing means for analyzing the sample signal to identify its characteristics, wherein the analyzing means interacts with the detecting means;
  c) identifying means for determining whether characteristics of the sample signal are similar or identical to a signal characteristic of a target radionuclide, and wherein the identifying means interacts with the analyzing means;

whereby if the sample signal is determined to be so similar or identical the apparatus has detected the target radionuclide, and whereby the apparatus, by identifying the sample signal as being so similar or identical, identifies a target radionuclide in the sample volume.

In a further aspect the invention discloses a high throughput apparatus for communicating the presence of a target radionuclide in a sample volume, the identity of a target radionuclide in a sample volume, or both, that includes a) detecting means for detecting radiation emanating from a radionuclide in a sample volume, wherein the detecting means produces a sample signal characteristic of the radionuclide;
b) analyzing means for analyzing the sample signal to identify its characteristics, wherein the analyzing means interacts with the detecting means;
c) identifying means for determining whether characteristics of the sample signal are similar or identical to a signal characteristic of a target radionuclide, and wherein the identifying means interacts with the analyzing means; and
d) communicating means that communicates a determination that the sample signal is so similar or identical;

whereby the apparatus communicates the presence of the target radionuclide in the sample volume, and whereby the apparatus communicates the identity of the target radionuclide in the sample volume.

In yet another aspect, the invention provides a high throughput apparatus for warning of the presence and/or the identity of a threatening radionuclide in a sample volume, that includes
a) detecting means for detecting radiation emanating from a radionuclide in a sample volume, wherein the detecting means produces a sample signal characteristic of the radionuclide;
b) analyzing means for analyzing the sample signal to identify its characteristics, wherein the analyzing means interacts with the detecting means;
c) comparing means for comparing characteristics of the sample signal to a set of signals, wherein each member of the set is a signal that is characteristic of a threatening radionuclide, wherein the comparing means interacts with the analyzing means;
d) identifying means for determining whether characteristics of the sample signal are similar or identical to a signal characteristic, of a threatening radionuclide, and wherein the identifying means interacts with the comparing means; and
e) warning means that warns that the sample signal is determined to be so similar or identical; whereby the apparatus warns of the presence of the threatening radionuclide in the sample volume, and whereby the apparatus warns of the identity of the threatening radionuclide in the sample volume.

In a further aspect, a method is disclosed for detecting a target radionuclide in a sample volume, or for identifying a target radionuclide present in a sample volume, or both, that includes the steps of
a) juxtaposing the sample volume and a detecting means that detects radiation emanating from a radionuclide such that the detecting means detects radiation emanating from the sample volume;
b) detecting radiation emanating from a radionuclide in the sample volume, wherein the detecting means produces a sample signal characteristic of the radionuclide;
c) analyzing the sample signal produced in step b) to identify its characteristics;
d) determining whether identified characteristics of the sample signal are similar or identical to a signal characteristic of the target radionuclide;

whereby if the sample signal is determined to be so similar or identical the target radionuclide is detected, and whereby identifying the sample signal as being so similar or identical identifies a target radionuclide in the sample volume.

In still another aspect, the invention discloses a method for communicating the presence of a target radionuclide in a sample volume, the identity of a target radionuclide in a sample volume, or both, that includes the steps of
a) juxtaposing the sample volume and a detecting means that detects radiation emanating from a radionuclide such that the detecting means detects radiation emanating from the sample volume; and
b) detecting radiation emanating from a radionuclide in a sample volume, wherein the detecting means produces a sample signal characteristic of the radionuclide;
c) analyzing the sample signal to identify its characteristics;
d) determining whether characteristics of the analyzed sample signal are similar or identical to a signal characteristic of a target radionuclide; and
e) communicating a determination that the characteristics of the sample signal are so similar or identical;

thereby communicating the presence of the target radionuclide in the sample volume, or the identity of the target radionuclide in the sample volume as having signal characteristics similar or identical to the sample signal.

In yet a further aspect, the invention discloses a method for warning of the presence and/or the identity of a threatening radionuclide in a sample volume, that includes the steps of
a) juxtaposing the sample volume and a detecting means for detecting radiation emanating from a radionuclide such that the detecting means detects radiation emanating from the sample volume, wherein the detecting means produces a sample signal characteristic of the radionuclide;
b) analyzing the sample signal to identify its characteristics;
c) comparing characteristics of the analyzed sample signal to a set of signals, wherein each member of the set is a signal that is characteristic of a threatening radionuclide;
d) determining that the characteristics of the analyzed sample signal are similar or identical to a signal characteristic of a threatening radionuclide; and
e) warning that the sample signal is determined to be so similar or identical;
thereby warning of the presence of the threatening radionuclide in the sample volume, and/or warning of the identity of a threatening radionuclide present in the sample volume.

In the various aspects of the apparatus and methods disclosed in this invention, significant embodiments include those wherein the radiation detected is a neutron, a gamma ray or an x-ray, an alpha particle, a beta particle or any combination thereof, or all of them. In a further significant embodiment the radiation detected is a neutron, a gamma ray or an x-ray, or any combination thereof, or all of them. In yet another important embodiment, the detecting means includes a scintillation detector, a solid-state gamma ray detector, a solid-state x-ray detector, a neutron detector, or any combination thereof, or all of them.

In additional advantageous embodiments, a target radionuclide or the threatening radionuclide is chosen from a set that includes cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source. or a radioactive decay product of uranium; or two or more target radionuclides or threatening radionuclides are chosen from among cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and radioactive decay products of uranium.

In another significant embodiment, the apparatuses and methods can detect and/or identify, or communicate, or warn of, a target radionuclide or a threatening radionuclide in an elapsed time from about 0.1 second to about 10 seconds. More significantly, the elapsed time is about 0.1 second to about 4 seconds, and still more significantly, the elapsed time is about 0.1 second to about 0.5 second.

DETAILED DESCRIPTION OF THE INVENTION

Figure 1:
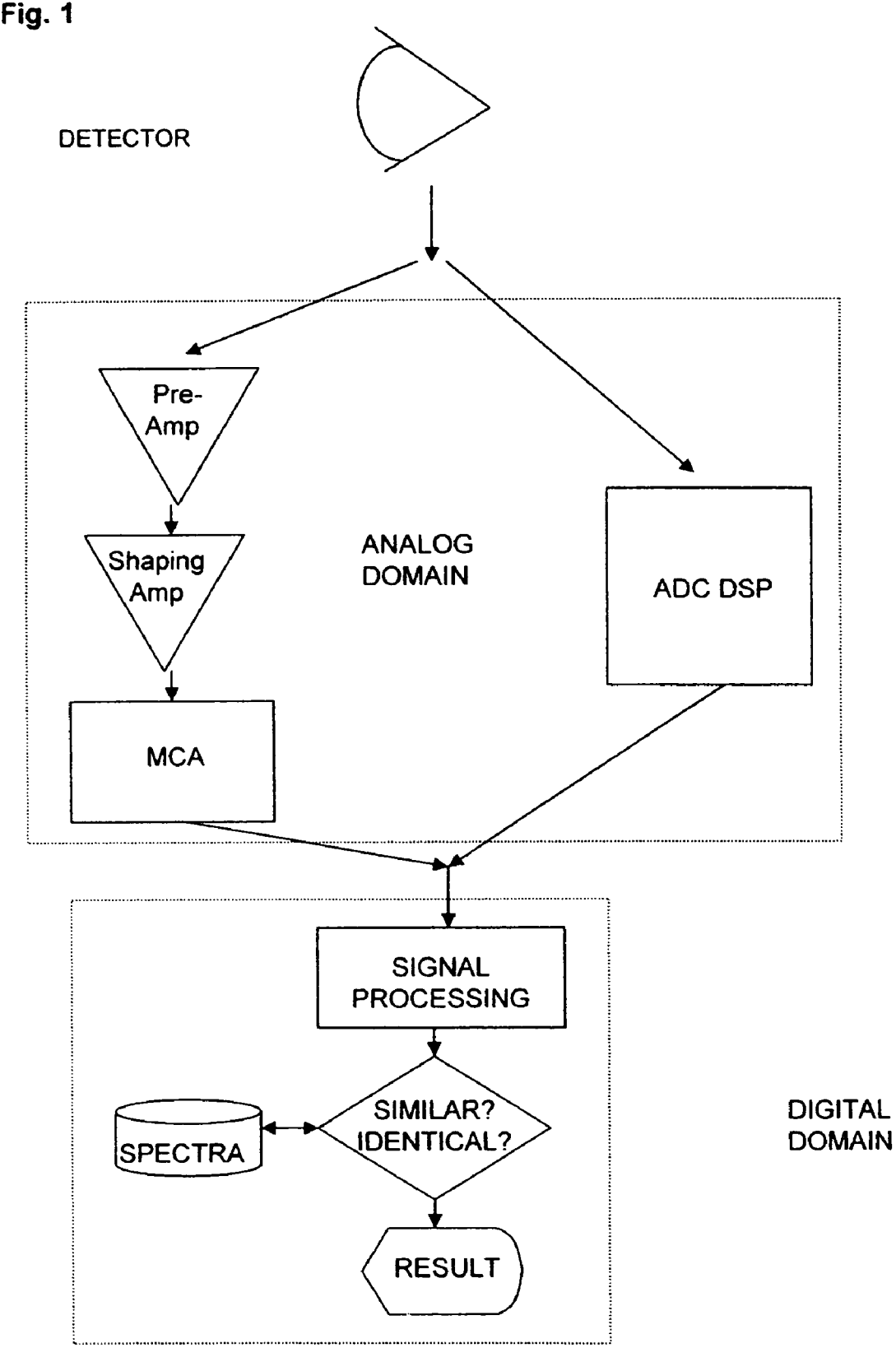
FIG. 1. Block diagram representation of an embodiment of the invention.

The present invention provides systems and methods to detect and/or identify any of a wide range of radionuclides. The systems and methods of the invention carry out the detection and/or identification rapidly, automatically and independently of human intervention. The present system and methods for detection and/or identification are capable of operating at high sampling rates, and with high throughput. As a result they may be installed in locations throughout the social, economic and infrastructure facilities of a nation, especially those facilities through which there is a high volume of public traffic. These include highways, where the systems may be installed at tollbooths or comparable lane facilities, train stations, airports, metropolitan mass transit systems, and in governmental and commercial buildings. In addition the systems of the invention may be installed in facilities used for transfer and transport of commercial goods. Nonlimiting examples of such facilities include truck terminals, railroad freight handling facilities, air transport facilities, and shipping ports receiving goods offloaded from ships. The invention still further provides a system and methods that detect and identify a particular radionuclide from among a set of candidate radionuclides that an antisocietal group or individual might deploy. The system and methods include the capability of providing an alarm or similar notification of a positive detection and/or identification of a suspect radionuclide in a sample. These capabilities permit assessing the nature of a threat as soon as it is detected.

As used herein, the phrase "digital computational apparatus" and similar related phrases are directed in general to a system that includes, but is not limited to, a processing unit, a unit with a subject program resident in a component such that the program is executable when needed to carry out the purposes of the present invention, and a memory storage component. In addition a digital computational apparatus commonly has one or more input modules to accept signals from a source, and one or more output modules transmitting a computational result. Any apparatus constituted to carry out the computational functions required to implement or employed in implementing the present invention are included within the scope of a "digital computational apparatus".

As used herein, the term "self-contained" and similar related terms are directed to the property of an apparatus or a module of an apparatus that all components of the apparatus, or of the module, are contained within a housing. The components are small enough that the overall dimensions of a housing containing the apparatus of the invention are relatively small. The advantage of the self-contained attribute of an apparatus or module of the invention is that it thereby may be installed with ease in any location where its use is desired or recommended.

As used herein, the term "high throughput" and related similar terms are directed to the property that an apparatus of the present invention has high sensitivity and short analysis time such that it may usefully be deployed in facilities in which each analysis must be carried out rapidly and relatively innocuously. Thus terms such as "high sensitivity", "rapid analysis", "short analysis time", use in "high traffic areas", and the like, are all comprehended within the meaning of the term "high throughput".

As used herein, the terms "characteristic", "characteristics", and similar related terms, are directed to a group of properties or elements of information that a signal may have that are typical for a particular signal, originating from a particular radionuclide, and that distinguish the signal from other signals originating from different radionuclides. Nonlimiting examples of properties that may be included when using the terms "characteristic", "characteristics" or related terms, are the energy or energies of photons or the type of a particle that constitutes the radiation emanating from a radionuclide, a particular peak of the radiation in a waveform, and the bandwidth of a particular peak in a signal. An example of a measure of bandwidth is the width of a peak at half-maximal peak height. A radionuclide may be associated with one or more particular peaks in a spectrum; the overall set of characteristics for a radionuclide may be termed a "signature", a "signature pattern" a "waveform", "spectrum", and the like. As used herein, the phrase "sample volume" and related phrases are directed to volumes of space which are subject to screening or sampling by the system and methods of the present invention.

Nonlimiting examples of such sample volumes include the volume of space occupied by an automobile, van, truck, tractor trailer, or similar road vehicles, or any portion thereof, a railroad car, wagon, or container placed on or in a railroad car or wagon, or any portion thereof, a boat, ship or similar naval vessel, or any container placed on or in such a naval vessel, or any portion thereof, personal luggage, baggage and goods carried by individuals, and so forth. Any equivalent sample volume subject to screening or sampling by the systems and methods of the invention are contemplated to fall within the scope of the invention.

As used herein, the terms "sample" or "sample signal" and similar related terms are directed to a signal, or a set of characteristics, that result from interrogating a sample volume during the operation of an apparatus or method of the present invention. The characteristics of the signal include the elements of information set forth above in the definition of "characteristics". Thus a sample or sample signal originates in real time as each subject that includes a sample volume comes under the scrutiny of the system and methods of the instant invention. The sample or sample signal includes the characteristics of any radionuclide present in the sample volume.

As used herein, the terms "reference" and "reference signal", and similar related terms, are directed to a group of properties or elements of information characteristic of a reference radionuclide or a standard radionuclide. The reference or standard radionuclide is any one of a set of candidate radionuclides or threatening radionuclides against which a sample is being screened. In important applications of the present invention, a candidate radionuclide or threatening radionuclide is deemed dangerous or threatening to society were it to be present in a nuclear device. Examples of reference radionuclides, together with representative characteristics thereof, are provided below in the present disclosure. As used herein, the terms "reference" or "reference signal" also relate to equivalent or analogous radionuclides not specifically identified herein but that nevertheless are or become deemed to be dangerous or threatening to society. In advantageous embodiments of the present invention a set of reference signals is made available to the system and methods of the invention in a storage device, memory device or storage medium.

As used herein the term "interact" and similar related terms are directed to indicating that two components or modules in an apparatus interact with each other in a way that permits the transfer or exchange of information between the two components or modules. The information commonly is an electronic signal in analog or digital form. In one embodiment the interaction can be means of solid electrical conductors such as wires, cables, waveguides, or fiber optical connectors, and the like; in an alternative form the interaction can be by means of electromagnetic radiation generated by one of the components and received by the second. In general any equivalent means of permitting communication between the components of a system are contemplated as being encompassed by "interacting".

As used herein the term "identical" and similar related terms, when used to describe a sample signal or sample generally, is intended to indicate that the signal from the sample has characteristics that are identifiable as being those of a reference or standard. For example, if a set of characteristics include properties such as a particle of radiation, or a photon of radiation, and a bandwidth of a peak in a spectrum, an identical sample would have values for a characteristic attribute that are less than 1.0 standard deviation, preferably less than 0.75 standard deviation, preferably less than 0.5 standard deviation, more preferably less than 0.3 standard deviation, more preferably less than 0.25 standard deviation, more preferably still less than 0.2 standard deviation, more preferably less than 0.15 standard deviation, more preferably less than 0.1 standard deviation, or more preferably still less than 0.05 standard deviation different from the value of a reference signal for the same characteristic. Other measures to establish similarity and identity may also be used. Depending on computational methods used to identify components in a sample waveform (see below), any statistical measure that establishes similarity or identity within a given limit of certainty or with a given probability may be used. For example, identity may be established with a p-value of $p<0.01$, or $p<0.005$, or $p<0.001$.

As used herein the term "similar" and related terms, when used to describe a sample signal or sample generally, is intended to indicate that the signal from the sample has characteristics that are identifiable as resembling those of a reference or standard sufficiently closely to be identifiable as being the characteristic of the particular reference or standard. For example, if a set of characteristics include properties such as a particle of radiation, or a photon of radiation, and a bandwidth of a peak in a spectrum, an identical sample would have values for a characteristic attribute that are less than 3.0 standard deviations, preferably less than 2.5 standard deviations, preferably less than 2.0 standard deviation, more preferably less than 1.5 standard deviation, more preferably between 1.5 standard deviations and 1.0 standard deviation different from the value of a reference signal for the same characteristic. Similarity may be likewise be established with a p-value of $p<0.1$, or $p<0.05$, or $p<0.02$. As used herein, the term "target", and similar related terms, when used to describe a radionuclide, are directed to any one of a set of radionuclides identified as being one whose presence in a sample volume is to be assayed. The identities of target radionuclides are established at any time by appropriate authorities. It is contemplated to be within the scope of the invention that the set of target radionuclides may change over time. In particular, it is possible that new target radionuclides may be added to a set over the course of time, or that certain radionuclides may be substituted for others. Any radionuclide identified by appropriate authorities at any time as being of interest to be detected in a sample volume is contemplated to be a target as used herein.

As used herein, the terms "analysis", "analyzing" and related similar terms are directed to processes such as generating a radiation spectrum, or a waveform, or a characteristic signature pattern from a signal provided by a detecting means of the invention. An aspect of analysis or analyzing may include transformation of a signal from a detecting means, which is commonly an analog signal, into a digital representation of the spectrum, waveform, or characteristic signature pattern. The digital representation may serve as input information for an identifying means.

As used herein, the terms "identifying", "identification" and similar related terms are directed to determining whether characteristics of the sample signal are similar or identical to a signal characteristic of a target radionuclide or a threatening radionuclide. Entities that may be employed in identifying include, by way of nonlimiting example, hardware and software components programmed to establish the similarity, identity, or lack thereof, of a waveform to one or more reference radiation spectra, waveforms, or characteristic signature patterns.

As used herein, the terms "comparing", "comparison" and similar related terms are directed to assessing whether a signal includes or is comprised of contributions from one or more reference spectra or reference waveforms. In certain embodiments, a set of reference spectra is stored in a digital storage medium and is available to hardware and software components programmed to carry out a comparison.

As used herein, the term "communicating" and similar related terms are directed to providing a cue or response to a person such that the person will understand that an apparatus has detected that a sample signal is similar or identical to a reference signal or a signal characteristic of a target radionuclide. Any sensory cue or response that informs the person of the detection event is understood to be included when a result is communicated. By way of nonlimiting example, detection can be communicated by a visual cue, an auditory cue, a contact, vibration or electrical cue, a printout, an electronic display, and so on. Any equivalent way of providing a cue or response is envisioned to be within the scope of the present invention.

As used herein, the term "threatening", and similar related terms, when used to describe a radionuclide, are directed to any one of a set of radionuclides identified as being one whose presence in a sample volume to be assayed is considered to be a threat to society. The identities of threatening radionuclides are established at any time by appropriate authorities. It is contemplated to be within the scope of the invention that the set of threatening radionuclides may change over time. In particular, it is possible that new threatening radionuclides may be added to a set over the course of time, or that a radionuclide may be substituted by another. Any radionuclide identified by appropriate authorities at any time as being of interest to be detected in a sample volume is contemplated to be "threatening" as used herein.

As used herein, the term "warning" and similar related terms are directed to alerting a person that a dangerous or threatening radionuclide has been detected and that potentially additional action is required to be taken essentially immediately. A warning may be, by way of nonlimiting example, a sharp, strong or intense sensory cue or response, such as a bright light, a flashing light, an alarm sound or alarm horn, and so on. A warning may be accompanied by a direct physical response automated to accompany the warning. Such a physical response may include imposing a physical barrier such that the person, vehicle or object that comprises the sample volume, or that is in the vicinity of the sample volume, is restrained from leaving the vicinity of the sample volume. Any equivalent sensory cue or response, or physical response, is contemplated to be within the scope of the present invention.

An apparatus employed in the present invention is comprised of at least three general modules, namely, a detector or a plurality of detectors, an analog signal analysis module and a digital signal recognition module. A generalized schematic diagram of an embodiment of an apparatus of the invention is shown in FIG. 1. One or more detectors ("DETECTOR") provide a raw signal to an analog signal analysis module ("ANALOG DOMAIN"), which directs the signal to one among a plurality of alternative paths. The ANALOG DOMAIN of FIG. 1 is a generalized example of an "analyzing means" of the invention. In the representation shown in FIG. 1, two paths are depicted. In the path on the left the designations have the following meanings: "Pre-Amp", preamplifier; "Shaping Amp", shaping amplifier; "MCA", multi-channel analyzer; in the alternative path on the right the designation "ADC DSP" stands for analog-to-digital converter digital signal processor. The output digital signal from the ANALOG DOMAIN serves as the input for the DIGITAL DOMAIN shown in FIG. 1. The DIGITAL DOMAIN generally includes hardware and software modules that constitute or comprise a nonlimiting example of an "identifying means" of the present invention. The DIGITAL DOMAIN includes a set of reference spectral characteristics of all or a representative selection of target radionuclides ("SPECTRA"); in exemplary embodiments the SPECTRA are recorded within a permanent storage device. The digital domain also includes computational modules programmed to process the digital input from the analog domain into a form suitable for analysis ("SIGNAL PROCESSING"), if needed, and for determining whether the input signals include signal characteristics that are similar or identical to at least one target radionuclide in the reference set ("SIMILAR? IDENTICAL?"). In the embodiment shown in FIG. I, the SIMILAR? IDENTICAL? decision module is an example of a "comparing means" of the invention. The result of the determination is output ("RESULT"), and may be used to communicate information to an operator, or to warn an operator of a threatening radionuclide.

The detectors contemplated for use in the present invention include detectors that are sensitive to neutrons, gamma radiation, x-ray radiation, alpha particle radiation, and beta particle radiation. Alpha particles and beta particles may either be detected directly, or as a result of bremsstrahlung radiation (secondary radiation). In important embodiments of an apparatus of the invention, detectors that are sensitive to neutrons, gamma radiation and x-ray radiation are employed. Detectors are widely available from commercial sources for the detection of these various classes of radiation, and are readily known to workers of skill in fields related to the present invention, including by way of nonlimiting example, radiation physics, nuclear physics, radiation chemistry, nuclear chemistry, environmental safety, public health and safety, and the like. The radiation sensitive component in various detectors include, by way of nonlimiting example, $BF_3$ (for neutrons), $^3He$ (He-3; for neutrons), NaI (for gamma rays), Ge (for gamma rays), Cadmium Zinc Telluride (for gamma rays (XRF Corp., Somerville, Mass.), solid state silicon or silicon-positive-intrinsic-negative detectors (for gamma rays and x-rays), CsI, cadmium telluride, mercuric iodide, and the like.

One or more of these detectors may be deployed in an apparatus of the invention. If more than one detector is present, they interact with the analog signal analysis module in parallel fashion such that information from each detector may be processed as called for without the need for intervention by an operator. Each detector is interfaced with a component in the analog signal analysis module to provide a full breadth of radiation specificity and sensitivity. One or more detectors are deployed in the proximity of the sample volume to be interrogated; it is not necessary that the analog signal analysis module or the digital signal analysis module be physically deployed with the detector or detectors. In one nonlimiting example of the present invention, a set of detectors is incorporated into a physically protective housing and placed in juxtaposition with an auto lane in order to assay for signals emanating from a sample volume that would be occupied by a passing motor vehicle. The housing shields against physical damage and environmental corrosion. The detectors in the housing are connected by cable to interact with the analog signal analysis module, which, in this example, is at a remote location. In general, the cable that effects the interaction between the set of detectors and the analog signal analysis module may be comprised of solid electrical conductors such as wires, or fiber optical conductors, or waveguides, or the like. The detector or detectors provide a raw signal response to the analog signal analysis module. Detectors of radionuclear radiation are widely known among workers of skill in fields related to the field of the invention. Such fields include, by way of nonlimiting example, radiation physics, nuclear physics, radiation chemistry, nuclear chemistry, environmental safety, public health and safety, and the like. Any equivalent detection module that captures the spectral dispersion of radiation emanating from a sample volume is contemplated as falling within the scope of the present invention.

The raw sample signal transmitted to the analog signal analysis module may be processed in at least two alternative ways (see FIG. 1). In one alternative, the sample signal is amplified and refined, for example, by passing the signal in turn through a preamplifier and a shaping amplifier. The amplified signal is provided to a multichannel analyzer, which prepares a digital representation of the waveform of the signal provided by the detectors. In another alternative the sample signal from the detector is provided directly to a module that serves as an analog-to-digital converter and as a digital signal processor which generates a digital representation of the waveform of the signal generated by the detectors. The digital representation of the sample waveform serves as the input for the digital domain (FIG. 1). Modules that capture waveforms provided by a detector module, and provide digital representations thereof, are widely known among workers of skill in fields related to the field of the invention. Such fields include, by way of nonlimiting example, radiation physics, nuclear physics, radiation chemistry, nuclear chemistry, environmental safety, public health and safety, and the like. Any equivalent module that serves to provide a digital representation of the spectral dispersion of a signal is understood to be within the scope of the present invention.

The digital domain includes several virtual modules that are computational procedures that take place within a computational device. Any of a wide range of computational devices is envisioned within the scope of the invention. In one example, the computational flow may be permanently incorporated into a hardware based device, such as a digital chip or microchip. In a second example, the computational flow may take place in a programmable computer, wherein the computations are incorporated into software stored in a memory device, and when implemented the memory device controls and operates the computational flow. Other physical embodiments of the computational flow occurring within the digital domain represented in FIG. 1 are envisioned to be within the scope of the present invention.

Embodiments of the computational procedures employed in the present invention are generally known among workers of skill in fields related to the field of the present invention, including by way of nonlimiting example, radiation physics, nuclear physics, radiation chemistry, nuclear chemistry, environmental safety, public health and safety, computer science, solid state and semiconductor science, and the like.

The computations envisioned in the present invention include steps such as a) inputting the digitized sample waveform from the analog domain; b) processing the waveform; c) arriving at a decision in which it is determined whether the input sample waveform includes or contains components that are similar or identical to at least one waveform resident in a library of stored waveforms or spectra wherein the stored waveforms are those characteristic of members of a set of target radionuclides or threatening radionuclides; and d) outputting the result of the decision. FIG. I provides a schematic representation of these steps.

The processing step and the decision step include processes such as a) a computational algorithm that prepares the digitized input spectrum for further analysis and characterization; and b) a computational algorithm whereby the prepared spectrum or waveform is analyzed to provide the identities of any target radionuclides any threatening radionuclides whose waveforms may be components of the sample waveform. The algorithm in step b) may be any computational procedure that analyzes a complex waveform into a set of contributions originating from basic or orthogonal components. Such computational procedures include, by way of nonlimiting example, deconvolution computations to identify or evaluate spectral components present; principal component analysis wherein eigenvectors are arrived at which represent waveforms of reference radionuclides as the orthogonal components present, and corresponding eigenvalues represent a measure of the extent to which the respective eigenvectors contribute; or neural network analysis wherein previous analytic experience to which the computational algorithm has been subjected contributes to subsequent analyses that provide the component waveforms. If a component waveform in the sample spectrum is similar or identical to the waveform of a target radionuclide or a threatening radionuclide then a positive decision has been reached. If no such determination is reached, then a negative decision, indicating the absence of characteristics of a target radionuclide or a threatening radionuclide in the sample waveform is made. Any equivalent computational algorithm may be used that accomplishes the resolution of the sample waveform into components and establishing whether a component is similar or identical to a member of the library of spectra is envisioned to be within the scope of the present invention. Such computational algorithms are widely known to workers of skill in fields related to the field of the present invention, including by way of nonlimiting example, radiation physics, nuclear physics, radiation chemistry, nuclear chemistry, environmental safety, public health and safety, computer science, applied physics, applied mathematics, and the like.

The apparatus and methods of the present invention may be employed to obtain the spectral waveform of a background sample, that is, of a sample signal obtained when no subject occupies the sample volume. Natural minerals and construction materials contain radionuclides within them as naturally occurring components. Frequently these background radionuclides are present at low levels. Nevertheless in many physical locations in which the apparatus of the present invention may be deployed, such as within an edifice constructed of materials incorporating background radionuclides, it is advantageous to accumulate a background sample in order to account for the spectral components that constitute the background radiation. Since the same components will be present when a subject is in the sample volume during an actual assay, the background spectrum may be employed to account for or neutralize the background components in the sample spectrum. In this way the net waveforms due to the subject in the sample volume are arrived at. It is believed that this ability to compensate for background waveform contributions to a sample spectrum offers an advantage of the present invention not found in previous screening systems and methods used to detect radionuclides.

A positive decision that a component waveform in the sample spectrum is similar or identical to the waveform of a target radionuclide or a threatening radionuclide effectively detects the presence of such a radionuclide in the sample volume, and identifies the offending radionuclide in the sample volume. One response to a positive identification is to communicate the presence of the target radionuclide in the sample volume, and to communicate the identity of the target radionuclide in the sample volume. This communication is made, for example, to an operator of the installation that has deployed the apparatus of the invention, or to appropriate enforcement authorities. An additional response to a positive identification is to warn of the presence of a threatening radionuclide in the sample volume, and to identify the threatening radionuclide in the sample volume. Such a warning may be, by way of nonlimiting example, a visual alarm to an operator or person of authority, an audible alarm to an operator or person of authority, rapid imposition of a physical restraint to impede the movement of the subject in the sample volume that triggered the positive decision, and the like.

The present invention additionally provides various methods that include detection and identification of target radionuclides or threatening radionuclides. In one aspect, a method is disclosed for detecting a target radionuclide in a sample volume, or for identifying a target radionuclide present in a sample volume, or both, that includes the steps of a) juxtaposing the sample volume and a detecting means that detects radiation emanating from a radionuclide such that the detecting means detects radiation emanating from the sample volume;

b) detecting radiation emanating from a radionuclide in the sample volume, wherein the detecting means produces a sample signal characteristic of the radionuclide;

c) analyzing the sample signal produced in step b) to identify its characteristics; d) determining whether identified characteristics of the sample signal are similar or identical to a signal characteristic of the target radionuclide; whereby if the sample signal is determined to be so similar or identical the target radionuclide is detected, and whereby identifying the sample signal as being so similar or identical identifies a target radionuclide in the sample volume.

In still another aspect, the invention discloses a method for communicating the presence of a target radionuclide in a sample volume, the identity of a target radionuclide in a sample volume, or both, that includes the steps of a) juxtaposing the sample volume and a detecting means that detects radiation emanating from a radionuclide such that the detecting means detects radiation emanating from the sample volume; and b) detecting radiation emanating from a radionuclide in a sample volume, wherein the detecting means produces a sample signal characteristic of the radionuclide;

c) analyzing the sample signal to identify its characteristics;

d) determining whether characteristics of the analyzed sample signal are similar or identical to a signal characteristic of a target radionuclide; and e) communicating a determination that the characteristics of the sample signal are so similar or identical; thereby communicating the presence of the target radionuclide in the sample volume, or the identity of the target radionuclide in the sample volume as having signal characteristics similar or identical to the sample signal.

In yet a further aspect, the invention discloses a method for warning of the presence and/or the identity of a threatening radionuclide in a sample volume, that includes the steps of a) juxtaposing the sample volume and a detecting means for detecting radiation emanating from a radionuclide such that the detecting means detects radiation emanating from the sample volume, wherein the detecting means produces a sample signal characteristic of the radionuclide;

b) analyzing the sample signal to identify its characteristics;

c) comparing characteristics of the analyzed sample signal to a set of signals, wherein each member of the set is a signal that is characteristic of a threatening radionuclide;

d) determining that the characteristics of the analyzed sample signal are similar or identical to a signal characteristic of a threatening radionuclide; and e) warning that the sample signal is determined to be so similar or identical; thereby warning of the presence of the threatening radionuclide in the sample volume, and/or warning of the identity of a threatening radionuclide present in the sample volume.

Approximately 1500 radionuclides are known at the present time. It is possible to include many or all of these as reference spectra of target radionuclides or threatening radionuclides. A consequence of having a large number of reference waveforms in a library resident in a storage device employed in the apparatus and methods of the invention, however, is to increase the analysis time required to make a decision. In addition, not all radionuclides are currently considered to be target radionuclides or threatening radionuclides. In the interests of providing apparatuses and methods that may be implemented in the field, and that accomplish the purpose of screening against components likely to be used in a nuclear device, and that provide analysis times in actual usage that are consistent with rapidity of analysis and convenience to the public, certain nonlimiting embodiments of the present invention restrict the identities of target radionuclides and threatening radionuclides to a relatively small number. For example, in one implementation of the present invention, a set of target radionuclides and the set of threatening radionuclides may include those shown in Table I.

TABLE I

Potential Target Radionuclides and Threatening Radionuclides

| Radionuclide | Half-life | Radionuclide | Half-life |
|---|---|---|---|
| cesium-137 | 30 years | iodine-131 | 8.05 days |
| cobalt-60 | 5.26 years | molybdenum 99 | 67 hours |
| strontium-90 | 28.1 years | technetium-99m | 6.0 hours |
| iridium-192 | 74.2 days | uranium-235 | $7.03 \times 10^8$ years |
| americium-241 | 458 years | uranium-238 | $4.46 \times 10^9$ years |
| manganese-54 | 303 days | transuranium radionuclides including those of plutonium and californium | |
| iron-55 | 2.6 years | a plutonium-beryllium source | |
| iodine-125 | 60 days | radioactive decay products of uranium | |
| iodine-130 | 12.4 hours | | |

In other embodiments, fewer radionuclides chosen from among this set may be used; and in still other embodiments a different set of target radionuclides or threatening radionuclides may be used, in which certain members of the above set are substituted by others, or still others are added to the set. Choices of which radionuclides to include are made by appropriate authorities in fields related to the field of the present invention, including by way of nonlimiting example radiation physics, nuclear physics, radiation chemistry, nuclear chemistry, environmental safety, public health and safety, and the like. Any reference set defined by appropriate authorities is envisioned as being within the scope of the present invention.

A consideration in implementing an apparatus and methods of the present invention is the total elapsed time required for analysis. A shorter analysis time increases the acceptability of screening, and convenience, to the screened subject. Implementation of short analysis times is related to factors such as the sensitivity of a detector, amplification of a signal, efficiency of a decision-making algorithm, and the number of reference spectra, among others. Nonlimiting examples of total elapsed times for analysis may be about 10 seconds, or about 7 seconds, or about 5 seconds, or about 3 seconds, or about 2 seconds, or about 1 second, or about 0.75 second, or about 0.5 second, or about 0.4 second, or about 0.3 second, or about 0.2 second, or about 0.1 second, or even shorter total elapsed times. A worker of skill in fields related to the field of the present invention has general understanding of factors such as these, and of ways in which to optimize the analysis time for deployment. These fields include, by way of nonlimiting example, radiation physics, nuclear physics, radiation chemistry, nuclear chemistry, environmental safety, public health and safety, computer science, applied physics, applied mathematics, and the like. Any elapsed time interval that provides convenient, acceptable screening procedures is understood to be within the scope of the present invention.

Figure 2:
FIG. 2. Photographic image of a housing containing a detector employed in the apparatus of the invention installed adjacent to a motor vehicle lane.
Figure 3A:
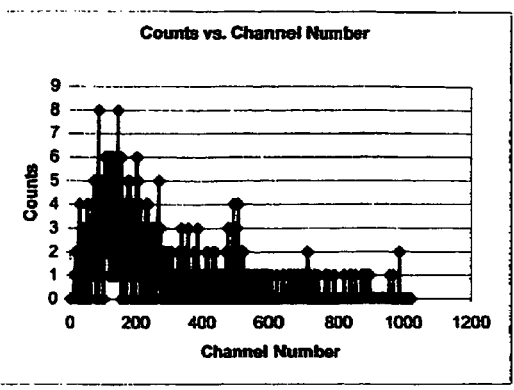
FIG. 3. Graphical representations of digital data provided by a multichannel analyzer for various samples placed in a sample volume in front of a detector. Elapsed analysis time is 4 sec. Panel A, Background; Panel B, Am-241, unshielded, detected at a distance of 10 feet; Panel C, Co-60 shielded by 1 inch of lead, detected at a distance of 6 feet; Panel D, Co-60 shielded by 1 inch of lead and Am-241 unshielded, detected at a distance of 6 feet.
Figure 3B:
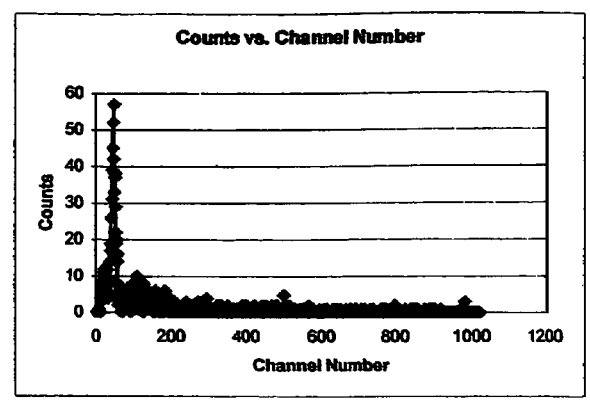
Figure 3C:
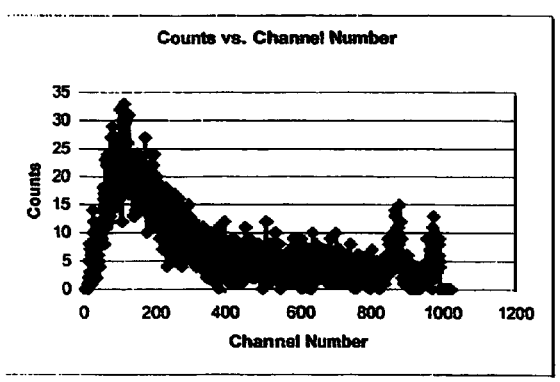
Figure 3D:
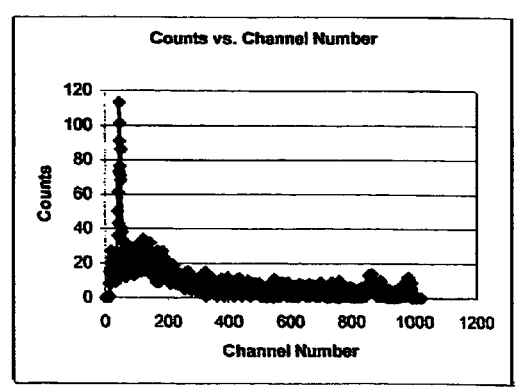
Figure 4A:
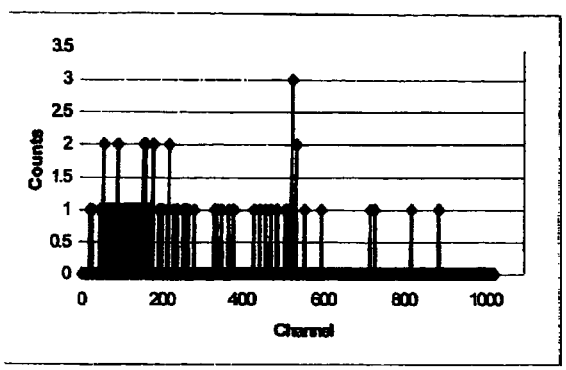
FIG. 4. Graphical representations of digital data provided by a multichannel analyzer for various samples placed in a sample volume in front of a detector. Elapsed analysis time is 0.5 sec. Panel A, Background; Panel B, Cs-137 shielded with 1 inch of lead, detected at a distance of 6 feet; Panel C, Cs137, unshielded, detected at a distance of 6 feet; Panel D, Co-60, Cs-137 and Am-241, unshielded, detected at a distance of 6 feet.
Figure 4B:
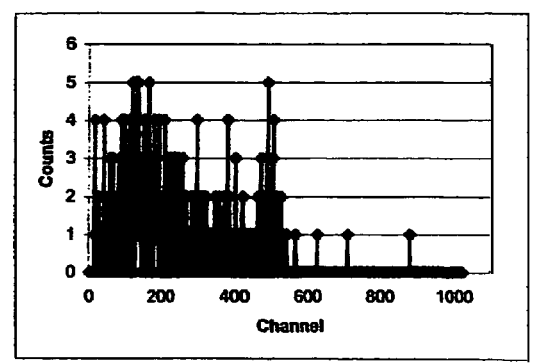
Figure 4C:
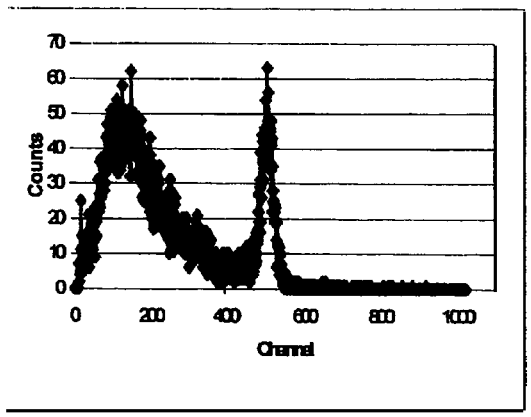
Figure 4D:
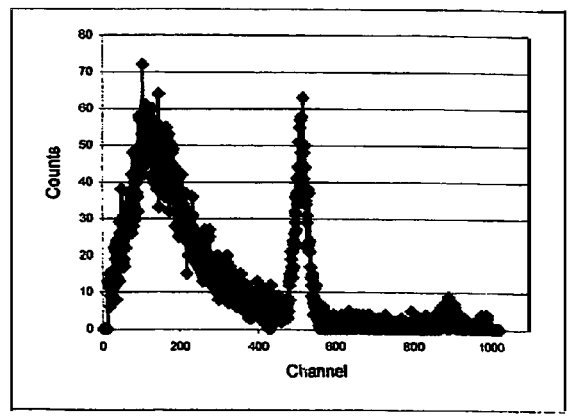

A nonlimiting example of a housing incorporating a detector employed in the apparatus of the invention is shown in FIG. 2. The housing has a diameter of approximately 4.5 inches and a length of approximately 17 inches. At the time the photograph was taken, the housing contained a NaI detector. The housing as shown, and similar embodiments of a housing, can accommodate at least three detectors; nonlimiting examples of which include a NaI detector, a cadmium-zinc-telluride detector, and a neutron detector based either on $BF_3$ or He-3 as the active element. The cable leading from the housing out of the photograph to the left is an example of an interacting means whereby the detectors interact with an analog signal analysis module. The latter module is at a remote location with respect to the detector.

EXAMPLES

In the following examples, background and samples were assayed in an apparatus of the invention using a detector having a Gamma 8000 NaI crystal (Amptek, Inc., Bedford, Mass.), a cadmium-zinc-telluride detector (Amptek), and a model 8000A multichannel analyzer manufactured by Amptek. The computations were implemented on a Dell Model 4100 Laptop computer. The distance between the detector and the sample was either 2 feet (providing a strong signal), 6 feet (providing a medium signal), or 10 feet (providing a weak signal). Three different sources were used as the samples in these Examples: a Co-60 source (441.4 microCi), a Cs-137 source (4.107 rmlliCi), and an Am-241 source (17.426 milliCi), all of which were obtained from New England Nuclear, Boston, Mass. In some cases, the Co-60 or the Cs-137 was shielded from the detector by a 1 inch shield of lead. The Am-241 was never shielded in these experiments. In all experiments the settings used were GAIN 2 and THRESHOLD 13.

Example I

4 Second Elapsed Accumulation Time

In this example, separate waveforms for Am-241, unshielded, and Co-60, shielded are shown, as well as the waveform obtained when both sources were in the sample volume. FIG. 3 shows the waveforms obtained. Panel A provides the multichannel analyzer output of a background count. It is seen that the background is very low. Panel B provides the waveform for Am-241 when the distance between the detector and the source was 10 feet. Table 2 shows the channel and count number obtained for the channel having the maximum count for Am-241 at all three distances.

TABLE 2

Am-241, 4 second elapsed time

| Distance, feet | Channel* | Counts |
|---|---|---|
| 10 | 49 | 57 |
| 6 | 47 | 128 |
| 2 | 45 | 10047 |

*The channel number depends on specific calibration in each run.

Panel C shows a waveform obtained with Co-60 shielded by 1 inch of lead at 4 sec when the distance between the detector and the source was 6 feet. Table 3 provides results for shielded Co-60 at all three distances tested, for the channels having a maximal reading in a peak region.

TABLE 3

Co-60, shielded by i inch of lead, 4 second elapsed time

| Distance, feet | Channel* | Counts | Channel* | Counts |
|---|---|---|---|---|
| 10 | 134 | 23 | 863 | 8 |
| 6 | 115 | 33 | 881 | 15 |
| 2 | 168 | 106 | 864 | 79 |

*The channel number depends on specific calibration in each run.

Panel D shows the results obtained when both shielded Co-60 and unshielded Am-241 are used as the source, at a distance of 6 feet. It is seen that the waveform obtained (Panel D) represents the expected superposition of the waveforms of the two radionuclides obtained when separate (Panels B and C).

Example 2

0.5 Second Elapsed Accumulation Time

FIG. 4 presents the results of selected experiments using a 0.5 sec accumulation time. Panel A presents a background reading, showing very low counts or none during the time elapsed. Panels B and C show waveforms accumulated for Cs-137 under different conditions. In Panel B, the source was shielded by 1 inch of lead, and the signal was accumulated at a distance of 6 feet. In Panel C the same source was unshielded, and the spectrum obtained at the same distance, 6 feet. In Panel D, the source contained three radionuclides in unshielded configuration, and was obtained at a distance of 6 feet. The separate waveforms corresponding to the sources used here appear in FIG. 3, Panel B (Am-241), FIG. 3, Panel C (Co-60), and FIG. 4, Panel C (Cs-137). The resulting waveform, shown in Panel D, includes contributions expected from each separate component.

Example 3

Warning of a Threatening Radionuclide at a Highway Interchange

An apparatus of the invention is installed in such a way as to interrogate motor vehicles at an interchange resembling a toll booth on a highway. The detector is mounted adjacent to the lane such that it is approximately 1-2 feet from the expected closest surface of the vehicle as it passes. A gate stops the vehicle momentarily while the detector accumulates the radiation spectrum from the vehicle. The digital domain of the apparatus is programmed with a neural network algorithm for identifying threatening radionuclides. If a threatening radionuclide is not detected the toll gate lifts and the vehicle exits the lane. If a threatening radionuclide is identified, a warning light and a warning horn are activated, and a security officer arrives to evaluate the situation.

Example 4

Warning of a Threatening Radionuclide at an Airport Security Check

An apparatus of the invention is installed at an airport security installation as part of the inspection of individual persons and hand-carried baggage. An individual together with his/her personal effects as carry-on baggage stands momentarily before a detector of the apparatus, at a distance of 1-2 feet from it. The digital domain of the apparatus is programmed with a principal component algorithm for identifying threatening radionuclides. If a threatening radionuclide is not detected the individual may pass through the security installation. If a threatening radionuclide is identified, a warning light and a portable alarm device carried by a security officer are activated, and the security officer summons the individual to evaluate the situation.

Example 5

Warning of a Threatening Radionuclide at a Shipping Facility

An apparatus of the invention is installed at a shipping terminal in such a way that shipping containers pass directly before, or under, one or more detector modules as they are offloaded from a vessel. The detector modules interact with the remainder of the apparatus by solid connectors or by means of electromagnetic radiation transmission. The digital domain of the apparatus is programmed with a deconvolution algorithm for identifying threatening radionuclides. If a threatening radionuclide is not detected the container may pass through the screening installation. If a threatening radionuclide is identified, a warning light, an warning sound, and a portable alarm device carried by a security officer are activated, and the security officer evaluates the situation.

The Examples demonstrate the ability of the apparatus and methods of the present invention to detect and identify target radionuclides and threatening radionuclides under field conditions. The apparatus and methods are useful at short accumulation times, permitting use in high throughput environments. The detection and identification of target radionuclides and threatening radionuclides communicates a positive determination to an operator or appropriate authorities, and provides a warning to an operator or appropriate authorities.

We claim:

1. A high throughput apparatus for detection of a target radionuclide in a sample volume, consisting of: a) an uncooled detector element for detecting radiation emanating from a radionuclide in a sample volume, wherein the detecting element produces a sample signal characteristic of the radionuclide; b) analyzing means for analyzing the sample signal to identify its characteristics, wherein the analyzing means receives an indication from the detecting element; c) identifying means for determining whether the characteristics of the sample signal are substantially identical to a signal characteristic of a target radionuclide, and wherein the identifying means interacts with the analyzing means; whereby if the sample signal is determined to be substantially identical the apparatus has detected the target radionuclide, and whereby the apparatus, by identifying the sample signal as being substantially identical, identifies a target radionuclide in the sample volume; wherein the detector element consists essentially of one selected from the group consisting of boron fluoride, helium-3, sodium iodide, cadmium zinc telluride, solid state silicon, positive-intrinsic-negative-silicon detectors, cesium iodide, and cadmium telluride.

2. The apparatus described in claim 1 wherein the radiation detected is a neutron, a gamma ray or an x-ray, an alpha particle, a beta particle or any combination thereof, or all of them.

3. The apparatus described in claim 1 wherein the radiation detected is a neutron, a gamma ray or an x-ray, or any combination thereof, or all of them.

4. The apparatus described in claim 1 wherein a target radionuclide is chosen from a set comprising cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and a radioactive decay product of uranium.

5. The apparatus described in claim 1 wherein the apparatus detects and identifies a plurality of target radionuclides chosen from among cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and a radioactive decay product of uranium.

6. The apparatus described in claim 1 that detects or identifies or both in an elapsed time from about 0.1 second to about 10 seconds.

7. The apparatus described in claim 6 wherein the elapsed time is about 0.1 second to about 4 seconds.

8. The apparatus described in claim 6 wherein the elapsed time is about 0.1 second to about 0.5 second.

9. A high throughput apparatus for communicating the presence of a target radionuclide in a sample volume, the identity of a target radionuclide in a sample volume, or both, consisting of: a) an uncooled detector element for detecting radiation emanating from a radionuclide in a sample volume, wherein the detecting element produces a sample signal characteristic of the radionuclide; b) analyzing means for analyzing the sample signal to identify its characteristics, wherein the analyzing means; receives an indication from the detecting element; c) identifying means for determining whether the characteristics of the sample signal are substantially identical to a signal characteristic of a target radionuclide, and wherein the identifying means interacts with the analyzing means; and d) communicating means that communicates a determination that the sample signal is substantially identical; whereby the apparatus communicates the presence of the target radionuclide in the sample volume, and whereby the apparatus communicates the identity of the target radionuclide in the sample volume;

wherein the detector element consists essentially of one selected from the group consisting of boron fluoride, helium-3, sodium iodide, cadmium zinc telluride, solid state silicon, positive-intrinsic-negative-silicon detectors, cesium iodide, and cadmium telluride.

10. The apparatus described in claim 9 wherein the radiation detected is a neutron, a gamma ray or an x-ray, an alpha particle, a beta particle or any combination thereof, or all of them.

11. The apparatus described in claim 9 wherein the radiation detected is a neutron, a gamma ray or an x-ray, or any combination thereof, or all of them.

12. The apparatus described in claim 9 wherein a target radionuclide is chosen from a set comprising cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and a radioactive decay product of uranium.

13. The apparatus described in claim 9 wherein the apparatus communicates the presence and identity of a plurality of target radionuclides chosen from among cesium-137, cobalt-60, strontium-90, iridium-192, americium-241, manganese-54, iron-55, iodine-25, iodine-130, iodine-131, molybdenum-99, technetium-99m, uranium-235, uranium-238, a transuranium radionuclide, a plutonium-beryllium source, a californium source, and a radioactive decay product of uranium.

14. The apparatus described in claim 9 that detects or identifies or both in an elapsed time from about 0.1 second to about 10 seconds.

15. The apparatus described in claim 14 wherein the elapsed time is about 0.1 second to about 4 seconds.

16. The apparatus described in claim 14 wherein the elapsed time is about 0.1 second to about 0.5 second.

17. A high throughput apparatus for warning of the presence and/or the identity of a target radionuclide in a sample volume, consisting of: a) an uncooled detector element for detecting radiation emanating from a radionuclide in a sample volume, wherein the detector element produces a sample signal characteristic of the radionuclide; b) analyzing means for analyzing the sample signal to identify its characteristics, wherein the analyzing means receives an indication from the detector element; c) comparing means for comparing the characteristics of the sample signal to a set of signals, wherein each member of the set is a signal that is characteristic of a target radionuclide, wherein the comparing means interacts with the analyzing means; d) identifying means for determining whether characteristics of the sample signal are substantially identical to a signal characteristic of a target radionuclide, and wherein the identifying means interacts with the comparing means; and e) warning means that warns that the sample signal is determined to be substantially identical; whereby the apparatus warns of the presence of the target radionuclide in the sample volume, and whereby the apparatus warns of the identity of the target radionuclide in the sample volume wherein the detector element consists essentially of one selected from the group consisting of boron fluoride, helium-3, sodium iodide, cadmium zinc telluride, solid state silicon, positive-intrinsic-negative-silicon detectors, cesium iodide, and cadmium telluride.

18. The apparatus described in claim 17 wherein the radiation detected is a neutron, a gamma ray or an x-ray, an alpha particle, a beta particle or any combination thereof, or all of them.

19. The apparatus described in claim 17 wherein the radiation detected is a neutron, a gamma ray or an x-ray, or any combination thereof, or all of them.

20. The apparatus described in claim 17 wherein a target radionuclide is chosen from a set comprising cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and a radioactive decay product of uranium.

21. The apparatus described in claim 17 wherein the apparatus provides a warning of the presence and identity of a plurality of target radionuclides chosen from among cesium-137, cobalt-60, strontium-90, iridium-192, americium-241, manganese-54, iron-55, iodine-125, iodine-130, iodine-131, molybdenum-99, technetium-99m, uranium-235, uranium-238, a transuranium radionuclide, a plutonium-beryllium source, a californium source, and a radioactive decay product of uranium.

22. The apparatus described in claim 17 that detects or identifies or both in an elapsed time from about 0.1 second to about 10 seconds.

23. The apparatus described in claim 22 wherein the elapsed time is about 0.1 second to about 4 seconds.

24. The apparatus described in claim 22 wherein the elapsed time is about 0.1 second to about 0.5 second.

* * * * *